United States Patent
Thomas et al.

(10) Patent No.: US 11,685,812 B1
(45) Date of Patent: Jun. 27, 2023

(54) ORGANOPOLYSILOXANE CLUSTER POLYMER FOR RAPID AIR CURE

(71) Applicants: Dow Silicones Corporation, Midland, MI (US); Dow Global Technologies LLC, Midland, MI (US)

(72) Inventors: Ryan Thomas, Auburn, MI (US); Nick Shephard, Auburn, MI (US); Gang Lu, Freeport, TX (US); Julia Sunderland, Auburn, MI (US)

(73) Assignees: DOW SILICONES CORPORATION, Midland, MI (US); DOW GLOBAL TECHNOLOGIES, LLC

(*) Notice: Subject to any disclaimer, the term of this patent is extended or adjusted under 35 U.S.C. 154(b) by 0 days.

(21) Appl. No.: 17/629,818

(22) PCT Filed: Aug. 30, 2021

(86) PCT No.: PCT/US2021/048163
§ 371 (c)(1),
(2) Date: Jan. 25, 2022

(87) PCT Pub. No.: WO2022/051204
PCT Pub. Date: Mar. 10, 2022

Related U.S. Application Data

(60) Provisional application No. 63/072,974, filed on Sep. 1, 2020.

(51) Int. Cl.
*C08G 77/50* (2006.01)
*C08G 77/20* (2006.01)
*C08G 77/18* (2006.01)

(52) U.S. Cl.
CPC ............. *C08G 77/50* (2013.01); *C08G 77/18* (2013.01); *C08G 77/20* (2013.01)

(58) Field of Classification Search
CPC ........ C08G 77/12; C08G 77/20; C08G 77/18; C08G 77/50; C08L 77/18; B01J 21/00; B01J 23/40
See application file for complete search history.

(56) References Cited

U.S. PATENT DOCUMENTS

| | | | |
|---|---|---|---|
| 5,516,812 A | 5/1996 | Chu et al. | |
| 6,451,870 B1 | 9/2002 | DeCato et al. | |
| 8,618,233 B2 | 12/2013 | Mvarez et al. | |
| 9,593,209 B2 | 3/2017 | Dent et al. | |
| 9,670,392 B2 | 6/2017 | Larson et al. | |
| 9,944,758 B2 | 4/2018 | Jiang et al. | |
| 10,280,265 B2 | 5/2019 | Eldred et al. | |
| 10,370,574 B2 | 8/2019 | Tan et al. | |
| 2006/0074212 A1 | 4/2006 | Chapman et al. | |
| 2015/0376476 A1 | 12/2015 | Rahim et al. | |
| 2016/0009865 A1* | 1/2016 | Jiang ..................... | C09J 183/06 556/437 |
| 2016/0108066 A1 | 4/2016 | Goto | |
| 2017/0335109 A1 | 11/2017 | Sarkar et al. | |

FOREIGN PATENT DOCUMENTS

| | | |
|---|---|---|
| WO | 2011056832 | 5/2011 |
| WO | 2014124362 | 8/2014 |
| WO | 2014124388 | 8/2014 |
| WO | 2019084397 | 5/2019 |
| WO | 2020131367 | 6/2020 |
| WO | 2020142443 | 7/2020 |

OTHER PUBLICATIONS

Office Action Report Letter from corresponding Japanese Patent Application No. 2022-5162777 dated Oct. 20, 2022.

* cited by examiner

*Primary Examiner* — Kuo Liang Peng
(74) *Attorney, Agent, or Firm* — Steven Mork

(57) ABSTRACT

A composition contains an organopolysiloxane having the following average chemical structure: $X_3SiO\text{—}SiR_2\text{—}R'\text{—}(R_2SiO)_x\text{—}R_2Si\text{—}[R^b\text{—}(R_2SiO)_y\text{—}R_2Si\text{—}R^{b'}\text{—}(R_2SiO)_z\text{—}R_2Si]_m\text{—}R'\text{—}R_2SiO\text{—}SiX_3$; where X is $\text{—}OSiR_2\text{—}R'\text{—}R_2SiO\text{—}R_2Si\text{—}R''\text{-}A$; R is an alkyl group having from 2 to 6 carbons and aryl groups; R', R", $R^b$ and $R^{b'}$ are divalent hydrocarbon groups comprising a chain of 2 to 6 methylene units; A is acrylate, methacrylate or trialkoxysilyl; provided that, on average, 60 to 90 mole-percent of the A groups are acrylate and methacrylate; Subscript m has an average value in a range of zero to 10; Subscripts x, y and z each has an average value in a range of zero to 1200; and provided that the average values of m, x, y and z are such that the sum of the average values for x, y and z is in a range of 300-1200 and the molar ratio of methylene units to siloxane units is less than 0.15.

9 Claims, No Drawings

ORGANOPOLYSILOXANE CLUSTER POLYMER FOR RAPID AIR CURE

FIELD OF THE INVENTION

The present invention relates to an organopolysiloxane cluster polymer, curable compositions comprising the organopolysiloxane cluster polymer and articles comprising such curable compositions in cured or uncured form.

INTRODUCTION

Acrylate or methacrylate ("(meth)acrylate") functional organopolysiloxanes can be useful for participating in free radical polymerization reactions such as those that occur when heating (meth)acrylate functional organopolysiloxanes in the presence of thermally induced radical initiators ("thermal initiators"). When (meth)acrylate functional organopolysiloxanes also contain alkoxy functionality, or are combined with other organopolysiloxanes having alkoxy functionality, the (meth)acrylate functional organopolysiloxanes can be part of a dual cure composition that partially cures by free radical induced polymerization through the (meth)acrylate group and by moisture curing through the alkoxy functionality. Free radical induced polymerization is often used to rapidly achieve an initial cure of the surface of a composition. The objective is to obtain a dry, tack-free surface quickly to preclude damage or contamination of the composition or contacting object upon contact while other portions of the composition can enjoy moisture curing over a longer time. Generally, when curing by heating to induce free radical polymerization, it is desirable to achieve a dry, tack-free surface by heating (thermal curing) in less than 60 minutes, preferably in 30 minutes or less at temperatures of 100-150 degrees Celsius (° C.).

A challenge with free radical curing of (meth)acrylate functional organopolysiloxanes is oxygen inhibition. When running the reaction in the presence of oxygen, oxygen interferes with the free radical polymerization of the (meth) acrylate. As a result, curing by free radical reaction of (meth)acrylate groups in air typically results in wet and/or tacky composition surfaces due to slow and/or insufficient free radical curing of the surface of the composition. Compositions that are cured by free radical polymerization of (meth)acrylate groups typically require a blanket of inert gas or other measures to preclude oxygen from interfering with the reaction. It would be a desirable advancement in the art to identify (meth)acrylate functional organopolysiloxane that could be thermally cured to a dry, tack-free surface by heating in air for 30 minutes or less at a temperature of 100-150° C. and that did not have to be protected from oxygen prior to or during curing.

Organopolysiloxanes often serve as curable adhesives where upon curing they adhere to one or more than one substrate. To adequately adhere to a substrate it is desirable that the organopolysiloxane achieve a torque modulus of at least 0.50 Newton*meter (N*m) when cured for 30 minutes at 100° C. to form a cured adhesive between two plates when tested using a moving die rheometer (MDR) according to ASTM D5289-95 (reapproved in 2001).

It is desirable and would advance the art to discover an organopolysiloxane that has both (meth)acrylate functionality for free radical polymerization and alkoxy functionality for moisture curing that can undergo thermal and moisture dual curing in a composition, and that can thermally cure in air at temperatures of 100° C. or higher to a tack-free surface in 30 minutes or less after exposure to ambient air for 20 minutes prior to heating to 100° C. or higher, and that cures in 30 minutes or less at 100° C. to an adhesive having a torque modulus of at least 0.50 N*m as a cured adhesive between two plates when tested using moving die rheometer according to ASTM D5289-95 (reapproved in 2001).

BRIEF SUMMARY OF THE INVENTION

The present invention provides a (meth)acrylate functional organopolysiloxane that has both (meth)acrylate functionality for free radical polymerization and alkoxy functionality for moisture curing that can undergo thermal and moisture dual curing in a composition, and that can thermally cure in air at temperatures of 100° C. or higher to a tack-free surface in 30 minutes or less after exposure to ambient air for 20 minutes prior to heating to 100° C. or higher, and that cures in 30 minutes or less at 100° C. to an adhesive having a torque modulus of at least 0.50 N*m as a cured adhesive between two plates when tested using moving die rheometer according to ASTM D5289-95 (reapproved in 2001).

The present invention is a result of discovering a cluster organopolysiloxane that contains terminal functionalities of which 60 to 90 mole-percent (mol %) are selected from acrylate and methacrylate groups and the rest of the terminal functionalities are trialkoxysilyl groups. Surprisingly, compositions comprising this cluster organopolysiloxane in combination with thermal initiators can thermally cure in air at temperatures of 100° C. or higher to a tack-free surface in 30 minutes or less even when exposed to ambient air for 20 minutes prior to heating, and that cures in 30 minutes or less at 100° C. to a cured adhesive having a torque modulus of at least 0.50 N*m as a cured adhesive between two plates when tested using a moving die rheometer (MDR) according to ASTM D5289-95 (reapproved in 2001).

In a first aspect, the present invention is a composition comprising a cluster organopolysiloxane having the following average chemical structure:

$$X_3SiO-SiR_2-R'-(R_2SiO)_x-R_2Si-[R^b-(R_2SiO)_y-R_2Si-R^{b'}-(R_2SiO)_z-R_2Si]_m-R'-R_2SiO-SiX_3$$

where:
(a) X=—OSiR$_2$—R'—R$_2$SiO—R$_2$Si—R"-A 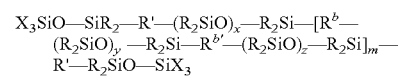
(b) R is independently in each occurrence selected from a group consisting of alkyl groups having from 2 to 6 carbons and aryl groups;
(c) R', R", R$^b$ and R$^{b'}$ are independently in each occurrence selected from divalent hydrocarbon groups comprising a chain of 2 to 6 methylene units;
(d) A is independently in each occurrence selected from a group consisting of acrylate, methacrylate and trialkoxysilyl groups; provided that, on average, 60 to 90 mole-percent of the A groups are selected from acrylate and methacrylate groups;
(e) Subscript m has an average value in a range of zero to 10;
(f) Subscripts x, y and z each independently in each occurrence has an average value in a range of zero to 1200; and provided that the average values of m, x, y and z are such that the sum of the average values for x, y and z is in a range of 300-1200 and the molar ratio of methylene units to siloxane units is less than 0.15.

The composition can and desirably does further comprise a thermal initiator and can further yet comprise a moisture cure catalyst. The composition, when containing a radical initiator and/or moisture cure catalyst, is a curable composition.

In a second aspect, the present invention is an article comprising a composition of the first aspect disposed onto a surface of a substrate. Desirably the composition is a curable composition and the article comprises the composition in a cured state.

DETAILED DESCRIPTION OF THE INVENTION

Test methods refer to the most recent test method as of the priority date of this document when a date is not indicated with the test method number. References to test methods contain both a reference to the testing society and the test method number. The following test method abbreviations and identifiers apply herein: ASTM refers to ASTM International methods; EN refers to European Norm; DIN refers to Deutsches Institut für Normung; ISO refers to International Organization for Standards; and UL refers to Underwriters Laboratory.

Products identified by their tradename refer to the compositions available under those tradenames on the priority date of this document.

"Multiple" means two or more. "And/or" means "and, or as an alternative". All ranges include endpoints unless otherwise indicated. Unless otherwise stated, all weight-percent (wt %) values are relative to composition weight and all volume-percent (vol %) values are relative to composition volume.

"Acrylate group" refers to a group having the following structure: —O—C(=O)—CH=$CH_2$ "Alkyl group" refers to an alkane having one hydrogen missing and replaced with a bond to the atom to which the alkyl group is attached.

"Ambient air" refers to air at 23-25° C. and 50 percent relative humidity.

"Methacrylate group" refers to a group having the following structure: —O—C(=O)—C($CH_3$)=$CH_2$.

"(Meth)acrylate" means "methacrylate or acrylate".

"Methylene unit" refers to a $CH_2$ segment, which can be in a longer alkylene chain or alone as a methylene. For instance, ethylene (—$CH_2CH_2$—) is an alkylene chain with 2 methylene units.

"Trialkoxysilyl group" refers a trialkoxysilane (HSi(OR)$_3$) with the hydrogen bound to the silicon atom replaced with a bond to the atom to which the trialkoxysilyl group is attached: —Si(OR)$_3$, where R is an alkyl group attached to the oxygen.

"Tack-free" is as defined in the Example section, below, under Cured Surface Wetness Evaluation.

Cluster Organopolysiloxane

The present invention is a composition that comprises (and can consist of) a cluster organopolysiloxane having the following structure (I):

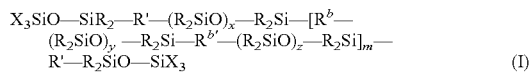

(I)

where:
(a) X=—OSiR$_2$—R'—R$_2$SiO—R$_2$Si—R"-A.
(b) R is independently in each occurrence selected from a group consisting of alkyl groups having from 2 to 6 carbons and aryl groups, preferably R is methyl.
(c) R', R", R$^b$ and R$^{b'}$ are independently in each occurrence selected from divalent hydrocarbon groups comprising a chain of 2 to 6 methylene units, preferably 2 methylene units (—($CH_2$)$_2$—) or 3 methylene units (—($CH_2$)$_3$—).
(d) A is independently in each occurrence selected from a group consisting of acrylate, methacrylate and trialkoxysilyl groups; provided that, on average, 60 to 90 mole-percent of the A groups are selected from acrylate and methacrylate groups. When fewer than 60 mole-percent or greater than 90 mole-percent of the A groups are selected from acrylate and methacrylate groups the material fails to cure to a tack-free surface when heated to 100° C. in 30 minutes or less when exposed to ambient air for 20 minutes prior to heating. Also, when fewer than 60 mole-percent of the A groups are selected from acrylate and methacrylate groups the composition fails to cure to an adhesive with greater than 0.50 N*m torque modulus as a cured adhesive between two plates in 30 minutes or less at 100° C. when tested using a moving die rheometer (MDR) according to ASTM D5289-95 (reapproved in 2001).
(e) Subscript m has an average value in a range of zero to 10, and can be zero or more, one or more, 2 or more, 3 or more, 4 or more, even 5 or more while at the same time is 10 or less, and can be 9 or less, 8 or less, 7 or less, 6 or less, 5 or less, 4 or less, 3 or less, 2 or less, even one or less;
(f) Subscripts x, y and z each independently in each occurrence has an average value in a range of zero to 1200, and any one of them can have an average value of zero or more 50 or more, 100 or more, 150 or more, 200 or more, 250 or more, 300 or more, even 350 or more while at the same time is 1200 or less, and can be 1100 or less, 1000 or less, 900 or less, 800 or less, 700 or less, 600 or less, 500 or less, 400 or less, 300 or less, even 200 or less;

provided that the average values of m, x, y and z are such that the sum of the average values for x, y and z is in a range of 300-1200, preferably 300 or more, 400 or more, 500 or more, 550 or more, 600 or more, 700 or more, 800 or more, even 900 or more while at the same time are 1200 or less, 1100 or less, 1000 or less, 900 or less, 800 or less, 700 or less, 600 or less, even 550 or less; and the molar ratio ("p") of methylene units to siloxane units is zero or more than zero, and at the same time less than 0.15, and can be 0.14 or less, 0.13 or less, 0.12 or less, 0.10 or less, 0.09 or less, 0.08 or less, 0.07 or less, 0.06 or less, 0.05 or less, 0.04 or less, 0.03 or less, 0.02 or less, even 0.01 or less. Determine values of m, x, y, z and p from $^1$H, $^{13}$C and $^{29}$Si nuclear magnetic resonance (NMR) spectroscopy of a sample of the organopolysiloxane.

Desirably, R' is —($CH_2$)$_2$— and additionally R" is —($CH_2$)$_3$— when connected to an A group that is acrylate or methacrylate and —($CH_2$)$_2$— when connected to an A group that is trialkoxysilyl. It is further desirable for the alkoxy group of trialkoxysilyl groups to be methoxy.

When the molar ratio p is greater than 0.15, then the resulting composition can suffer from lower thermal stability at temperatures greater than 150° C., lower stability to ultraviolet radiation, and/or the composition can become stiff or brittle when exposed to temperatures below −50° C.

When the sum of x, y and z is less than 300, the cross link density can become so high as to result in a brittle composition with undesirably low elasticity. If the sum of x, y and z is greater than 1200, then the resulting polymer viscosity can be so high that it becomes difficult to formulate useful compositions due to excessive heat generation and excessive pressure required to dispense or pump the material.

If m is greater than 10, the stoichiometric balance needed to make sure the polymer is SiH terminated becomes statistically and experimentally difficult to achieve due to the nature of the step growth reaction.

It is not possible to achieve R', R", Rb or Rb' with fewer than 2 methylene units when using hydrosilylation chemistry. When they contain more than 6 methylene units the raw materials become excessively expensive and if too high above 6 then the molar ratio p will be difficult to keep at or below 0.15.

Synthesis of Cluster Organopolysiloxane

The cluster organopolysiloxane can be synthesized by hydrosilylation. The process can be a 2-step hydrosilylation reaction process or a single-step hydrosilylation reaction process where Step 1 and Step 2 are done together by mixing all components together in a single reaction vessel. However, a 2-step process where Step 1 is completed and the product used in Step 2 as a separate reaction is desirable in order to reduce the exothermic potential of the reaction.

The first step (Step 1) is to react a linear hydrogen terminated polyorganosiloxane having structure (II) with an excess molar concentration of a vinyl functionalized neopentamer having structure (III) in the presence of a platinum catalyst and heat to produce a functionalized linear organopolysiloxane of structure (IV):

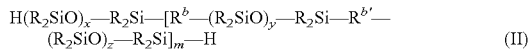

(II)

(III)

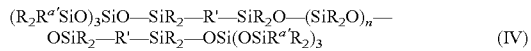

(IV)

where R, R', $R^b$, $R^{b'}$, x, y, z, and m are as described above and $R^{a'}$ corresponds to a terminally unsaturated precursor to R' formed by removing a hydrogen from a carbon adjacent to a terminal carbon of R' and forming a double bond between that carbon and the terminal carbon. For instance $R^{a'}$ for an R' that contains two methylene units is a vinyl group (—CH=$CH_2$) and $R^{a'}$ for an R' that contains three methylene units is an allyl group having the following structure: —$CH_2$—CH=$CH_2$.

Desirably, m is zero and structure (II) is a SiH-terminal polydialkyl (preferably, polydimethyl) siloxane of structure (IIb):

(IIb)

When m is greater than zero, it is possible to synthesize the linear hydrogen terminated polyorganosiloxane (II) from alkenyl functional polydialkyl (preferably polydimethyl) siloxanes and SiH-terminal polydialkyl (preferably, polydimethyl) siloxanes using a hydrosilylation reaction to link multiple of the polydialkyl siloxanes together. The examples, herein below, illustrate how to do such a reaction to form a linear hydrogen terminated polyorganosiloxane (II).

The second step (Step 2) is to react the product of Step 1 containing the linear organopolysiloxane of structure (IV) with functionalized disiloxanes having the molecular structure of structure (V):

(V)

in the presence of platinum catalyst and heat to produce the cluster organopolysiloxane of the present invention, where R, R" and A are as described previously.

By-Products

Step 2 of the synthesis typically occurs concurrently with Step 1 or follows Step 1 of the 2-step hydrosilylation reaction without isolating the functionalized linear organopolysiloxane of structure (IV). In either case, the excess vinyl functionalized neopentamer is present with the linear organopolysiloxane of structure (IV) and also undergoes further reactions during the Step 2 reaction to form by-products. It is common for the reaction product of Step 2 of the synthesis to have up to 25 weight-percent (wt %) by-products relative to weight of the sum of by-products and cluster organopolysiloxane. In fact, often the reaction product of Step 2 comprises 5 wt % or more, 10 wt % or more, 15 wt % or more, even 20 wt % or more by-products while at the same time typically contains 25 wt % or less by-products relative to the sum of by-products and cluster organopolysiloxane. The by-products comprise compounds having the following molecular structure (VI):

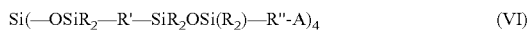

(VI)

where R, R', R" and A are as previously described.

The composition of the present invention can be or comprise the reaction product of the 2-step reaction for making the cluster organopolysiloxane, including the cluster organopolysiloxane and any by-products that might be present.

Curable Composition

The composition of the present invention can be a curable composition that comprises a thermal initiator in addition to the cluster organopolysiloxane and optionally a moisture cure catalyst and optionally other components. When the composition comprises a thermal initiator it is a thermally curable composition. When the composition comprises both a thermal initiator and a moisture cure catalyst the composition is a dual cure composition that cures both thermally and by exposure to moisture.

Examples of suitable thermal initiators include 1,1-bis(t-butylperoxy)-3,3,5-trimethyl cyclohexane, 2,2-bis(t-butylperoxybutane), t-butylperoxy isopropyl carbonate, Di-t-butyldiperoxyazelate, t-butyl peracetate, t-butyl perbenzoate, dicumyl peroxide, alpha-alpha'-bis(t-butylperoxy)diisopropyl benzene, 2,5-dimethyl-2,5-bis(benzoylperoxy) hexane, di-t-butylperoxide, t-butyl peroxypivalate, t-butyl peroxyneodecanoate, t-butyl peroxy-2-ethylhexoate, dibenzoyl peroxide, dilauroyl peroxide, 1,1'-azo-bis-cumene, and 2,2'-azo-bis-2-methylvaleronitrile. When a thermal initiator is present it is typically present at a concentration of 0.01 wt % or more, 0.1 wt % or more, or even 0.5 wt % or more while at the same time is typically 5.0 wt % or less, 3.0 wt % or less, or even 2.0 wt % or less based on total weight of reactants.

The curable compositions can further comprise a moisture cure catalyst to form a dual cure composition. The moisture cure catalyst facilitates moisture induced curing of the alkoxysilyl groups on the cluster organopolysiloxane. Suitable moisture cure catalysts include titanium (IV) isopropoxide, titanium (IV) n-butoxide, titanium (IV) t-butoxide, titanium (IV), titanium di(isopropoxy)bis(ethylacetoacetate), titanium di(isopropoxy)bis(methylacetoacetate), titanium di(isopropoxy)bis(acetylacetonate), zirconium (IV) isopropoxide, zirconium (IV) n-butoxide, zirconium (IV) t-butoxide, zirconium di(isopropoxy)bis(ethylacetoacetate), zirconium di(isopropoxy)bis(methylacetoacetate), zirconium di(isopropoxy)bis(acetylacetonate, dimethyltin dinedodecanoate, dibutyltin dilaurate, dibutyltin dioctoates, and stannous octoate and any combinations thereof.

The curable composition can optionally comprise in addition to the thermal initiator and/or moisture cure catalyst, or be free of, any one or more additional components. Examples of suitable additional components include fillers (such as quartz, fumed silica, and calcium carbonate), pigments (such as carbon black, and iron oxide), alkoxysilanes and/or the condensation products of alkoxy silanes, inhibitors (such as butylated hydroxytoluene (BHT)), and ultraviolet tracers.

Method of Using Curable Composition

The curable compositions of the present invention can be used in many different applications including as an adhesive, a sealant or as a coating. In such applications, the use of the composition comprises the steps of applying the composition to a substrate and then curing the composition to form an article having the cured composition on the substrate. For instance, the method may comprise applying the curable composition to a substrate and subjecting the composition on the substrate to heat and optionally moisture.

EXAMPLES

Table 1 lists the components used in the following Examples (Exs) and Comparative Examples (Comp Exs). "Vi" in the molecular structure in Table 1 refer to vinyl groups (—CH=$CH_2$).

CP1: 50/50 Methacrylate/ETM Functional CP. Add to a Max200 speed mixer cup 37.21 grams (g) SiH Terminated Siloxane Intermediate 2 and 51.73 g Vinyl Terminated Siloxane 1 and then blend two times using a dynamic axial centrifuge (DAC mixer) for 30 seconds at 2000 revolutions per minute (RPM). Add 0.025 g of Catalyst Solution to provide approximately 1.5 weight parts platinum by weight of the mixture in the dental cup. Blend using a DAC mixer for 30 seconds at 2000 RPM. Place the sample in an over at 70° C. for 30 minutes. The resulting material is a Linear SiH Terminated Siloxane 1 having an degree of polymerization of approximately 556 and having a chemical structure of Structure (II) with the following variable values: R=methyl in all cases, $R^b=R^{b'}$="—$CH_2CH_2$—", x=119, y=311, z=119, and m=1.

To the reaction mixture comprising Linear SiH Terminated Siloxane 1 add 3.66 g of Tetrakis-dimethylvinylsiloxy silane, 3.64 g of Methacrylate Converter and 3.95 g of ETM Converter. Mix using a DAC mixer for 30 seconds at 2000 RPM. Add 0.025 g of Catalyst Solution to provide approximately 5.0 weight parts platinum by weight of the mixture

TABLE 1

| Component | Description | Source |
|---|---|---|
| SiH Terminated Siloxane Intermediate 1 | A polysiloxane having the following average molecular structure: $(CH_3)_2HSiO$—$((CH_3)_2SiO)_{20}$—$OSiH(CH_3)_2$ | Available under the name XIAMETER ™ OFX-5057 from The Dow Chemical Company ("TDCC"). |
| SiH Terminated Siloxane Intermediate 2 | A polysiloxane having the following average molecular structure: $(CH_3)_2HSiO$—$((CH_3)_2SiO)_{110}$—$OSiH(CH_3)_2$ | Available under the name XIAMETER ™ OFX-5567 from TDCC. |
| Vinyl Terminated Siloxane 1 | A polysiloxane having the following average molecular structure: $(CH_3)_2ViSiO$—$((CH_3)_2SiO)_{110}$—$OSiVi(CH_3)_2$ | Available under the name XIAMETER RBL-9117 from TDCC. |
| Vinyl Terminated Siloxane 2 | A polysiloxane having the following average molecular structure: $(CH_3)_2ViSiO$—$((CH_3)_2SiO)_{830}$—$OSiVi(CH_3)_2$ | Available under the name XIAMETER RBL-9128 from TDCC. |
| Vinyl Terminated Siloxane 3 | A polysiloxane having the following average molecular structure: $(CH_3)_2ViSiO$—$((CH_3)_2SiO)_{520}$—$OSiVi(CH_3)_2$ | Available under the name XIAMETER RBL-9120 from TDCC. |
| Catalyst Solution | A Karstedt's catalyst solution that contains 0.5 wt % platinum dispersed in polysiloxane. | Available under the name SYL-OFF ™ 4000 Catalyst from TDCC. |
| Tetrakis-dimethylvinylsiloxy silane | A siloxane have the following structure: $Si(OSiVi(CH_3)_2)_4$ | Synthesize according to teachings in US6806339. |
| Methacrylate Converter | Methacryloxypropyl-tetramethyldisiloxane $H(CH_3)_2Si$—$OSi(CH_3)_2$—$(CH_2)_3$—$OC(O)C(CH_3)CH_2$ | Synthesize according to teachings in U.S. Pat. No. 10280265 |
| ETM Converter | Ethylenetrimethoxysilyl-tetramethyldisiloxane $H(CH_3)_2Si$—$OSi(CH_3)_2$—$(CH_2)_2Si(OCH_3)_3$ | Synthesize according to teachings in U.S. Pat. No. 4871827 |
| Quartz Filler | 5 micron average size ground quartz. | Available under the name MIN-U-SIL ™ 5 from Western Reserve Chemical. |
| Adhesion Promoter 1 | Glycidyloxypropyltrimethoxysilane | Available under the name XIAMETER OFS-6040 Silane from TDCC. |
| Adhesion Promoter 2 | tetraethoxysilane | Available under the name XIAMETER OFS-6697 Silane from TDCC. |
| SiH End blocker ($M^HM^H$) | 1,1,3,3,-tetramethyldisiloxane | Sigma Aldrich |
| Dimethyl cyclics ($D_4$) | Octamethylcyclotetrasiloxane | Available under the name DOWSIL ™ 244 Fluid from TDCC |
| Acid Catalyst | Trifluoromethanesulfonic acid | Sigma Aldrich |

XIAMETER and SYL-OFF are a trademarks of The Dow Corning Corporation.
DOWSIL is a trademark of The Dow Chemical Company.
MIN-U-SIL is a trademark of U.S. Silica Company Corporation.
Synthesis of Polyorganosiloxane Cluster Polymers ("CPs")

in the dental cup. Mix using a DAC mixer for 30 seconds at 2000 RPM. Place the mixture in an oven at 70° C. for one hour. Remove the mixture from the oven and allow to cool to 23-25° C. Add 0.03 g butylatedhydroxytoluene (Sigma-Aldrich) and 0.03 g of diallyl maleate (Sigma-Aldrich). Analyze the resulting mixture by $^1$H NMR spectroscopy, which reveals no residual SiH and trace level of vinyl functionality remaining when the reaction is complete. The resulting product mixture comprises CP1, which has an average chemical structure of Structure (I) with the following variable values: R=methyl in all cases, R'=$R^b$=$R^{b'}$="—CH$_2$CH$_2$—", x=119, y=311, z=119, m=1, on average 50 mole-percent (mol %) of the X units have R"="—CH$_2$CH$_2$CH$_2$—" with A=methacrylate and 50 mol % of the X units have R"="—CH$_2$CH$_2$—" with A=trialkoxysilyl groups and the molar ratio of methylene units to siloxane units is 0.007. The resulting product mixture also contains from 7 to 9 wt % by-product having the chemical structure of (VI) with the values for R, R', R" and A as described for CP1.

CP1 has a viscosity of 93,350 milliPascals*seconds (mPa*s) using a Brookfield DV-II cone and plate viscometer with the CP-52 spindle at 5 RPM at 23° C.

CP2: 60/40 Methacrylate/ETM Functional CP. Prepare CP2 in like manner as CP1 except use 4.37 g of Methacrylate Converter and 3.16 g of ETM Converter. The resulting product mixture comprises CP2, which has an average chemical structure of Structure (I) with the following variable values: R=methyl in all cases, R'=$R^b$=$R^{b'}$="—CH$_2$CH$_2$—", x=119, y=311, z=119, m=1, on average 60 mole-percent (mol %) of the X units have R"="—CH$_2$CH$_2$CH$_2$—" with A=methacrylate and 40 mol % of the X units have R"="—CH$_2$CH$_2$—" with A=trialkoxysilyl groups and the molar ratio of methylene units to siloxane units is 0.007. The resulting product mixture also contains from 7 to 9 wt % by-product having the chemical structure of (VI) with the values for R, R', R" and A as described for CP2.

CP2 has a viscosity of 90,490 mPa*s using a Brookfield DV-II cone and plate viscometer with the CP-52 spindle at 5 RPM at 23° C.

CP3: 70/30 Methacrylate/ETM Functional CP. Prepare CP3 in like manner as CP1 except use 5.10 g Methacrylate Converter and 2.37 g ETM Converter. The resulting product mixture comprises CP3, which has an average chemical structure of Structure (I) with the following variable values: R=methyl in all cases, R'=$R^b$=$R^{b'}$="—CH$_2$CH$_2$—", x=119, y=311, z=119, m=1, on average 70 mole-percent (mol %) of the X units have R"="—CH$_2$CH$_2$CH$_2$—" with A=methacrylate and 30 mol % of the X units have R"="—CH$_2$CH$_2$—" with A=trialkoxysilyl groups and the molar ratio of methylene units to siloxane units is 0.007. The resulting product mixture also contains from 7 to 9 wt % by-product having the chemical structure of (VI) with the values for R, R', R" and A as described for CP3.

CP3 has a viscosity of 85,250 mPa*s using a Brookfield DV-II cone and plate viscometer with the CP-52 spindle at 5 RPM at 23° C.

CP4: 80/20 Methacrylate/ETM Functional CP. Prepare CP4 in like manner as CP1 except use 5.83 g Methacrylate Converter and 1.58 g ETM Converter. The resulting product mixture comprises CP4, which has an average chemical structure of Structure (I) the following variable values: R=methyl in all cases, R'=$R^b$=$R^{b'}$="—CH$_2$CH$_2$—", x=119, y=311, z=119, m=1, on average 80 mole-percent (mol %) of the X units have R"="—CH$_2$CH$_2$CH$_2$—" with A=methacrylate and 20 mol % of the X units have R"="—CH$_2$CH$_2$—" with A=trialkoxysilyl groups and the molar ratio of methylene units to siloxane units is 0.007. The resulting product mixture also contains from 7 to 9 wt % by-product having the chemical structure of (VI) with the values for R, R', R" and A as described for CP4.

CP4 has a viscosity of 94,140 mPa*s using a Brookfield DV-II cone and plate viscometer with the CP-52 spindle at 5 RPM at 23° C.

CP5: 90/10 Methacrylate/ETM Functional CP. Prepare CP5 in like manner as CP1 except use 6.56 g Methacrylate Converter and 0.79 g ETM Converter. The resulting product mixture comprises CP5, which has an average chemical structure of Structure (I) with the following variable values: R=methyl in all cases, R'=$R^b$=$R^{b'}$="—CH$_2$CH$_2$—", x=119, y=311, z=119, m=1, on average 90 mole-percent (mol %) of the X units have R"="—CH$_2$CH$_2$CH$_2$—" with A=methacrylate and 10 mol % of the X units have R"="—CH$_2$CH$_2$—" with A=trialkoxysilyl groups and the molar ratio of methylene units to siloxane units is 0.007. The resulting product mixture also contains from 7 to 9 wt % by-product having the chemical structure of (VI) with the values for R, R', R" and A as described for CP5.

CP5 has a viscosity of 90,650 mPa*s using a Brookfield DV-II cone and plate viscometer with the CP-52 spindle at 5 RPM at 23° C.

CP6: 100/0 Methacrylate/ETM Functional CP. Prepare CP6 in like manner as CP1 except use 7.29 g Methacrylate Converter and 0.00 g ETM Converter. The resulting product mixture comprises CP6, which has an average chemical structure of Structure (I) with the following variable values: R=methyl in all cases, R'=$R^b$=$R^{b'}$="—CH$_2$CH$_2$—", x=119, y=311, z=119, m=1, on average 100 mole-percent (mol %) of the X units have R"="—CH$_2$CH$_2$CH$_2$—" and A=methacrylate and the molar ratio of methylene units to siloxane units is 0.007. The resulting product mixture also contains from 7 to 9 wt % by-product having the chemical structure of (VI) with the values for R, R', R" and A as described for CP6.

CP6 has a viscosity of 93,820 mPa*s using a Brookfield DV-II cone and plate viscometer with the CP-52 spindle at 5 RPM at 23° C.

CP7: 80/20 Methacrylate/ETM Functional CP.

To a 2 liter three neck round bottom flask equipped with glass stir rod with Teflon paddle, water chilled condenser, nitrogen purge, and temperature controller with thermocouple, add the following: 2.9 g of 1,1,3,3-tetramethyldisiloxane ($M^HM^H$) and 997.1 g Octamethylcyclotetrasiloxane ($D_4$). Mix at 200 rpm, then add 0.3 ml of trifluoromethanesulfonic acid using a syringe. Increase stirring rate to 250 rpm and heat the contents of the flask to 55° C. After 5 hours, reduce the temperature to 25° C., then add 10 g sodium bicarbonate; allow mixture to continue stirring at 250 rpm for 2 hours. Pressure filter contents using a 1.5 liter canister filter equipped with 5 micron filter paper at 20 psi; collect filtered product in a 2 liter three neck round bottom flask. Once filtration is complete, equip with glass stir rod with Teflon paddle, water cooled glass distillation apparatus, 250 mL round bottom collection flask, and temperature controller with thermocouple. Begin stirring at 250 rpm and pull vacuum on the system, achieving <5 mmHg, then heat the contents of the flask to 150° C. Maintain strip conditions for four hours, then cool to room temperature prior to releasing vacuum and decanting material. The resulting material is a linear SiH terminated polydimethylsiloxane having a degree of polymerization of approximately 642 as determined by $^1$H NMR spectroscopy ("SiH Terminated Siloxane Intermediate 3").

Add to a Max200 speed mixer cup 89.74 g of the SiH Terminated Siloxane Intermediate 3. Add 3.272 g of Tetrakis-dimethylvinylsiloxy silane, 5.498 g of Methacrylate Converter and 1.491 g of ETM Converter. Mix using a DAC mixer for 30 seconds at 2000 RPM. Add 0.050 g of Catalyst Solution to provide approximately 5.0 weight parts platinum by weight of the mixture in the dental cup. Mix using a DAC mixer for 30 seconds at 2000 RPM. Place the mixture in an oven at 70° C. for one hour. Remove the mixture from the oven and allow to cool to 23-25° C. Add 0.03 g butylated-hydroxytoluene (Sigma-Aldrich) and 0.03 g of diallyl maleate (Sigma-Aldrich). Analyze the resulting mixture by $^1$H NMR spectroscopy, which reveals no residual SiH and trace level of vinyl functionality remaining when the reaction is complete.

The resulting product mixture comprises CP7, which has an average chemical structure of Structure (I) with the following variable values: R=methyl in all cases, $R'=R^b=R^{b'}=$"—$CH_2CH_2$—", x=642, y=0, z=0, m=0, on average 80 mole-percent (mol %) of the X units have R"="—$CH_2CH_2CH_2$—" with A=methacrylate and 20 mol % of the X units have R"="—$CH_2CH_2$—" with A=trialkoxysilyl groups and the molar ratio of methylene units to siloxane units is 0. The resulting product mixture also contains from 7 to 9 wt % by-product having the chemical structure of (VI) with the values for R, R', R" and A as described for CP7.

CP7 has a viscosity of 42,500 milliPascals*seconds (mPa*s) using a Brookfield DV-II cone and plate viscometer with the CP-52 spindle at 5 RPM at 23° C.

Synthesis of Alkoxysilyl-Terminated Polydimethyl Siloxane INT

To a 500 mL three-neck round bottomed flask equipped with a mechanical stirring mechanism, heating mantle, thermocouple, and nitrogen blanket, add the following reagents: 200.0 g of Vinyl Terminated Siloxane 2 and 1.88 g of Methacrylate Converter. Blend the contents to form a mixture and then add 0.16 g of Catalyst Solution. Heat the mixture to 70° C. for one hour, and then allow to cool to 23-25° C. Add 0.16 g of diallylmaleate (Sigma-Aldrich) to the mixture. Analyze the resulting mixture by $^1$H NMR, which reveals no residual SiH and trace level of vinyl functionality remaining, confirming the reaction is complete. The resulting product is an alkoxysilyl-terminated polydimethyl siloxane, referred to as Alkoxysilyl-Terminated Polydimethyl Siloxane INT.

Curable Formulations

Prepare thermally curable formulations using each of the CPs and then evaluate them as described below.

Prepare the thermally curable formulations by combining 40 weight-parts CP and 38 weight-parts Quartz Filler in a Max200 speed mixer cup. Mix the components by hand and then using a DAC mixer for 30 seconds at 2500 RPM. Repeat until the mixture is a homogeneous paste. Transfer the paste to a crystallization dish and heat to 120° C. for 30 minutes in vacuo to provide a polymer-filler mixture.

To a separate Max200 speed mixer cup at 78 weight-parts of the polymer-filler mixture and 177.7 parts Alkoxysilyl-Terminated Polydimethyl Siloxane INT. Hand mix the components using a spatula and then mix at 2000 RPM for 30 seconds using a DAC mixer. Repeat mixing until the mixture is homogeneous. Add 0.6 weight-parts Adhesion Promoter 1 and 1.2 weight-parts Adhesion Promoter 2. Mix by hand and then at 2000 RPM for 30 seconds using the DAC mixer. Repeat mixing until homogeneous. Add 2.3 weight-parts of a 50 weight-parts mixture of bis(4-methylbenzoyl)peroxide paste (United Initiators) in silicone oil and mix using the DAC mixer for 30 seconds at 1200 RPM. Add 0.2 weight-parts 2,5-diisopropoxy bis(ethylacetoacetanoyl)titanium ("TDIDE", Dorf Ketal) and mix using the DAC mixer for 30 seconds at 1200 RPM. Transfer the resulting mixture into a 177.4 milliliter (6 ounce) SEMCO tube, centrifuge for 5 minutes and allow to equilibrate at 25° C. for 48 hours.

Evaluation of Curable Formulations

Evaluate whether a curable formulation cures to a tack-free surface using the Cured Surface Wetness Evaluation procedure. Determine torque modulus for the curable formulations using the Moving Die Rheometer Evaluation procedure.

Cured Surface Wetness Evaluation. Apply a 1.27 millimeter thick film of a thermally cured formulation ("sample") onto an aluminum Q-panel (8.89 centimeters by 12.7 centimeters) using a draw down bar. Allow the film to remain exposed to air (23-25° C. and 50% relative humidity) for 20 minutes and then cure in an air oven at 100° C. for 30 minutes. Allow the cured sample to cool 15 minutes at 23-25° C. Lightly touch the film with a nitrile gloved finger and roll the gloved finger over the film. If any of the film transfers to the glove the film fails the test and is not considered tack-free. If the glove remains free of film, then the film passes the test and the film is considered tack-free.

Moving Die Rheometer Evaluation. Determine final toque in accordance with the method ASTM D5289-95 (reapproved in 2001) "Standard Test Method for Rubber Property—Vulcanization Using Rotorless Cure Meters." Use a Permier MDR (Alpha Technologies) with material located between pre-heated parallel plates. Monitor torque while curing the material between the plates at 100° C. for 30 minutes. Record the final torque at 30 minutes. The desired final torque is greater than 0.50 Newton-meters.

Results for the Curable Formulations

Table 2 contains Cured Surface Wetness Evaluations and Moving Die Rheometer Evaluations for the Curable Formulations containing each of the cluster polymers. The curable formulations are identified by the CP used in the formulation. Ratios for the CP indicate average molar ratio of methacrylate functionality to Ethylenetrimethoxysilyl (ETM) functionality.

TABLE 2

| | Curable Formulation | | | | | | |
|---|---|---|---|---|---|---|---|
| Evaluation | CP2 (50/50) | CP2 (60/40) | CP3 (70/30) | CP4 (80/20) | CP5 (90/10) | CP6 (100/0) | CP7 (80/20) |
| Cured Surface Wetness (tack free: Y/N) | N | Y | Y | Y | Y | N | Y |
| Moving Die Rheometer (Final Torque (N * m)) | 0.45 | 0.56 | 0.59 | 0.62 | 0.64 | 0.71 | 0.62 |

The results in Table 2 reveal that when the average molar ratio of methacrylate functionality to Ethylenetrimethoxysilyl (ETM) functionality is below 60/40 or above 90/10, then the film does not result in a tack free surface. Additionally, when the average molar ratio of methacrylate functionality to Ethylenetrimethoxysilyl (ETM) functionality is below 60/40 then the final torque is below 0.50 N*m. CP7 illustrates that no chain extension is required to achieve target degree of polymerization.

What is claimed is:

1. A composition comprising a cluster organopolysiloxane having the following average chemical structure:

$$X_3SiO-SiR_2-R'-(R_2SiO)_x-R_2Si-[R^b-(R_2SiO)_y-R_2Si-R^{b'}-(R_2SiO)_z-R_2Si]_m-R'-R_2SiO-SiX_3$$

where:
- (a) $X = -OSiR_2-R'-R_2SiO-R_2Si-R''-A$;
- (b) R is independently in each occurrence selected from a group consisting of alkyl groups having from 2 to 6 carbons and aryl groups;
- (c) R', R", $R^b$ and $R^{b'}$ are independently in each occurrence selected from divalent hydrocarbon groups comprising a chain of 2 to 6 methylene units;
- (d) A is independently in each occurrence selected from a group consisting of acrylate, methacrylate and trialkoxysilyl groups; provided that, on average, 60 to 90 mole-percent of the A groups are selected from acrylate and methacrylate groups;
- (e) Subscript m has an average value in a range of zero to 10;
- (f) Subscripts x, y and z each independently in each occurrence has an average value in a range of zero to 1200; and provided that the average values of m, x, y and z are such that the sum of the average values for x, y and z is in a range of 300-1200 and the molar ratio of methylene units to siloxane units is less than 0.15.

2. The composition of claim 1, where each R is a methyl.

3. The composition of any claim 1, where m=0 and each R' is $-(CH_2)_2-$ and each R" is $-(CH_2)_3-$ when connected to an A group that is acrylate or methacrylate and $-(CH_2)_2-$ when connected to an A group that is trialkoxysilyl.

4. The composition of claim 1, where the alkoxy groups of the trialkoxysilyl groups are independently in each occurrence selected from methoxy, ethoxy and propoxy.

5. The composition of claim 1, where the composition further comprises by-products that have the following structure:

$$Si(-OSiR_2-R'-SiR_2OSi(R_2)-R''-A)_4.$$

6. The composition of claim 1, wherein the composition is a curable composition that further comprises a thermal initiator.

7. The composition of claim 6, wherein the composition further comprises a moisture cure catalyst.

8. An article comprising the composition of claim 1 disposed onto a surface of a substrate.

9. The article of claim 8, where the composition is a curable composition and is in a cured state as part of the article.

* * * * *